United States Patent [19]
Rau

[11] 3,957,129
[45] May 18, 1976

[54] STEERING SYSTEM
[75] Inventor: Jim L. Rau, Lafayette, Ind.
[73] Assignee: TRW Inc., Cleveland, Ohio
[22] Filed: Feb. 7, 1974
[21] Appl. No.: 440,370

[52] U.S. Cl. .............................. 180/152; 60/384
[51] Int. Cl.² ....................................... B62D 5/08
[58] Field of Search ............... 180/79.2 R, 79.2 B; 60/384

[56] References Cited
UNITED STATES PATENTS

| | | | |
|---|---|---|---|
| 3,520,135 | 7/1970 | Liebert | 180/79.2 R |
| 3,556,242 | 1/1971 | Dollase | 180/79.2 R |
| 3,587,235 | 6/1971 | Goff | 180/79.2 R |

Primary Examiner—Robert R. Song
Assistant Examiner—John A. Pekar

[57] ABSTRACT

A vehicle steering system comprises a set of steering cylinders which, when actuated, effect vehicle steering. The set of steering cylinders comprises at least two proportionately sized cylinders. The proportionate sizing of the cylinders is determined by the rod-end area to head-end area ratio of the cylinders. A steering control means directs two different flows to the respective cylinders in accordance with the proportionate sizing thereof to effect actuation thereof for steering purposes. One of these flows is directed to the head end of one cylinder and the other flow is directed to the rod end of the other cylinder. The steering control means also receives the return flow from the proportionately sized cylinders. The steering control means comprises a valve means for directing the flows to the cylinders and for receiving the return flows, a metering means for metering one of the flows, and an operator controlled input for actuating the valve means and the metering means to effect steering of the vehicle.

5 Claims, 6 Drawing Figures

STEERING SYSTEM

BACKGROUND OF THE INVENTION

This invention relates to hydrostatic steering systems, and more particularly to steering systems for heavy duty vehicles where substantial fluid flow is required to effect vehicle steering.

A common conventional steering system known in the art is a hydrostatic steering system and typical of hydrostatic steering units utilized in such system is shown in Goff U.S. Pat. No. 3,542,543. In general, such units include a valve which is actuated upon turning of the steering wheel and which then directs fluid from a supply pump through a metering mechainsm to the power steering cylinder to thereby effect steering of the vehicle. The metering mechanism effects a proper follow-up action between the steering wheel and the vehicle wheels so that the vehicle wheels properly turn with turning of the steering wheel. In addition, the metering mechanism in certain systems acts as a pump for effecting steering when the supply pump is not operating to enable manual steering to occur even when the supply pump is inoperative.

In steering systems for effecting steering of large vehicles where a substantial volumetric flow rate is required to effect the steering of the vehicle, the use of the conventional type of hydroststic steering as noted above is not practical, one reason being that the metering means therein must be of a substantial size to handle the necessary flows, which in turn creates problems.

SUMMARY OF THE PRESENT INVENTION

The present invention is directed to a practical hydrostatic steering system, particularly applicable to effect steering of large vehicles where a substantial volumetric flow rate is required, and which is not subject to the above-noted problems and, yet, has all the advantages of the conventional system providing the proper follow-up action so that the steering of the vehicle does follow the turning of the steering wheel accurately and correctly.

The present invention provides such an advantageous system by providing in the system a set of steering cylinders which, when actuated, effect the vehicle steering and where the set of steering cylinders includes at least two proportionately sized cylinders. The proportionate sizing of the cylinders is determined by the rod-end area to head-end area ratio of the cylinders.

In a specific preferred embodiment disclosed herein the rod-end area is smaller than the head-end area of the cylinders, and specifically the rod-end area is one-half the area of the head-end of the cylinders. The fluid flow directed to the cylinders to effect actuation thereof is directed to the rod end of one of the cylinders and to the head end of the other cylinder to effect steering of the vehicle. These flows are at two different volumetric rates in order to effect proper steering and specifically are in a ratio in accordance with the proportionate sizing of the cylinders.

In accordance with the present invention, a hydrostatic steering controller is provided for effecting those proportionate rate flows and that controller comprises a valve means for directing the flows to the proportionately sized cylinders and for receiving the return flows. The controller also includes a metering mechanism for metering one of the flows in response to turning of the steering wheel to provide the proper follow-up action between the steering wheel and the vehicle wheels. The controller also, of course, includes a suitable input mechanism for operating the valve means and the metering means in response to operator steering of the vehicle. Since the metering mechanism acts on one proportionate amount of the fluid flow, the size thereof need not be large and yet the proper follow-up action between the steering wheel and vehicle wheels is maintained.

In one embodiment of the invention, the valve means directs a flow to the metering means and then to a cylinder for effecting steering. The other flow of fluid to the other cylinder for effecting steering bypasses the metering means. In this embodiment, if the supply pump is not operating, the metering mechanism may be manually operated to effect a flow of fluid for actuating vehicle steering.

In another embodiment of the invention, the valve means directs a return flow from a cannot to the metering means. In such embodiment, manual steering cannnot be achieved, if the supply pump is inoperative.

BRIEF DESCRIPTION OF THE DRAWINGS

Other objects, features and advantages of the invention, its organization, construction and operation will be best understood from the following detailed description of a preferred embodiment of the invention taken in conjunction with the accompanying drawings in which.

DESCRIPTION OF THE PREFERRED EMBODIMENTS

As noted above, the present invention relates to hydrostatic steering systems requiring high volumetric flow rates and includes at least two steering cylinders which are proportionately sized. The present invention may be applied to different systems. The specific embodiments illustrated and disclosed herein are representative only of the application of the invention.

Figure 1:
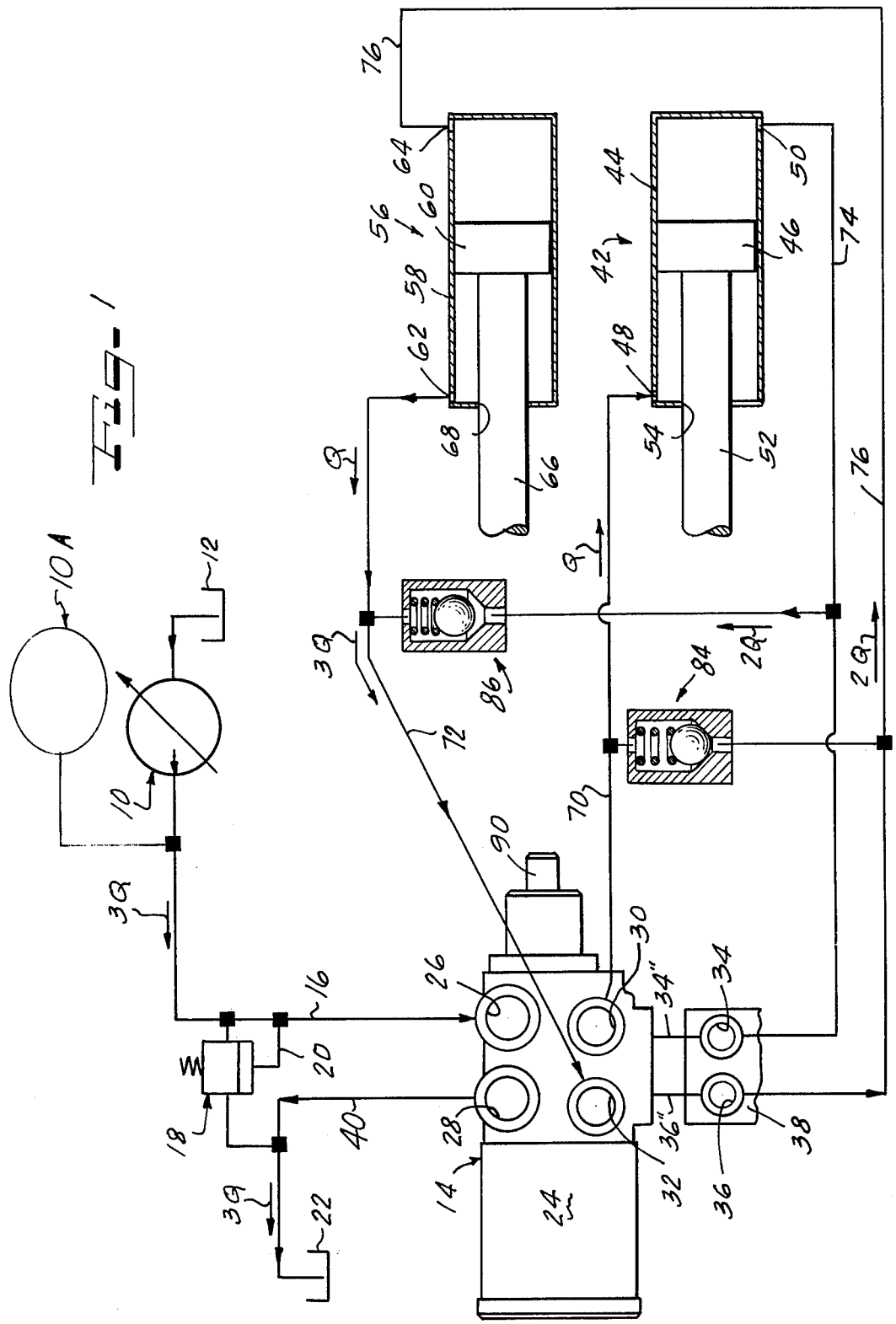
FIG. 1 is a schematic fluid circuit diagram of one embodiment of a hydrostatic steering system constructed in accordance with the principles of the present invention.

The hydraulic circuit illustrated in FIG. 1 includes a fluid controller indicated generally at reference numeral 14. The fluid controller 14 includes a housing 24 in which are formed a fluid inlet port 26, a fluid return port 28, a pair of steering cylinders or working ports 30 and 32, and a pair of auxiliary ports 34 and 36 formed in a block 38 which may be an integral part of the housing 24. The fluid inlet port 26 is connected to the discharge side of the pump 10 by means of a conduit 16 and the fluid return port 28 is connected to a fluid reservoir 22 by means of a conduit 40.

Although multiple fluid reservoirs are shown in FIG. 1, it should be operation that all are open to atmosphere and therefore the operatoon of the invention does not require a multiplicity of reservoirs. On the contrary, all can be interconnected or combined into a single reservoir. In either event, the single reservoir or the multiple reservoirs are effectively connected to the suction side of the power fluid pump 10, as is indicated with respect to the reservoir 12.

The various components of the hydraulic circuit, as well as the interconnecting conduits or piping, are constructed to operate at a fluid pressure which does not exceed a predetermined allowable working or operating pressure. The hydraulic circuit includes a pressure relief valve 18 which relieves the pressure in the hydraulic circuit in the event it rises above the predetermined operating level, as schematically indicated by a pilot passageway 20 in the valve 18. A pressure relief mechanism is commonly employed in power steering systems and the desirability thereof is commonly appreciated by those skilled in the art.

The hydraulic circuit includes a pair of fluid actuators, here hydraulic cylinders 42 and 56. The hydraulic cylinder 42 includes a cylinder housing 44 in which a piston 46 is slidably disposed between a pair of input-/output ports 48 and 50. The piston 46 carries an extensible piston rod 52 which extends in a sealed manner through a hole 54 in the housing 44. The hydraulic cylinder 56 includes a cylindrical housing 58 in which a piston 60 is slidably disposed between a pair of input-/output ports 62 and 64. The piston 60 carries an extensible piston rod 66 which extends in a sealed manner through a hole 68 in the housing 58.

As shown in FIG. 1, the input/output ports 48, 62 are connected to the working ports 30, 32 via respective conduits 70, 72 and the input/output ports 50, 64 are connected to the auxiliary ports 34, 36 via respective conduits 74, 76. The port 50 is also connected to the conduit 72 by way of a block check valve 86. Similarly, the port 64 is connected to the conduit 70 via a block check valve 84.

Before describing the total steering system and the operation thereof, the fluid controller 14 will be described as an aid in understanding all of the aspects of the invention. Together, the hydraulic cylinders 42 and 56 are connected to turn the wheels or the like of the vehicle on which the hydraulic circuit is mounted for steering purposes. Specifically, the cylinders may be connected to a pivotal frame of an articulated vehicle, which frame carries the steered wheels of the vehicle.

Figure 2:
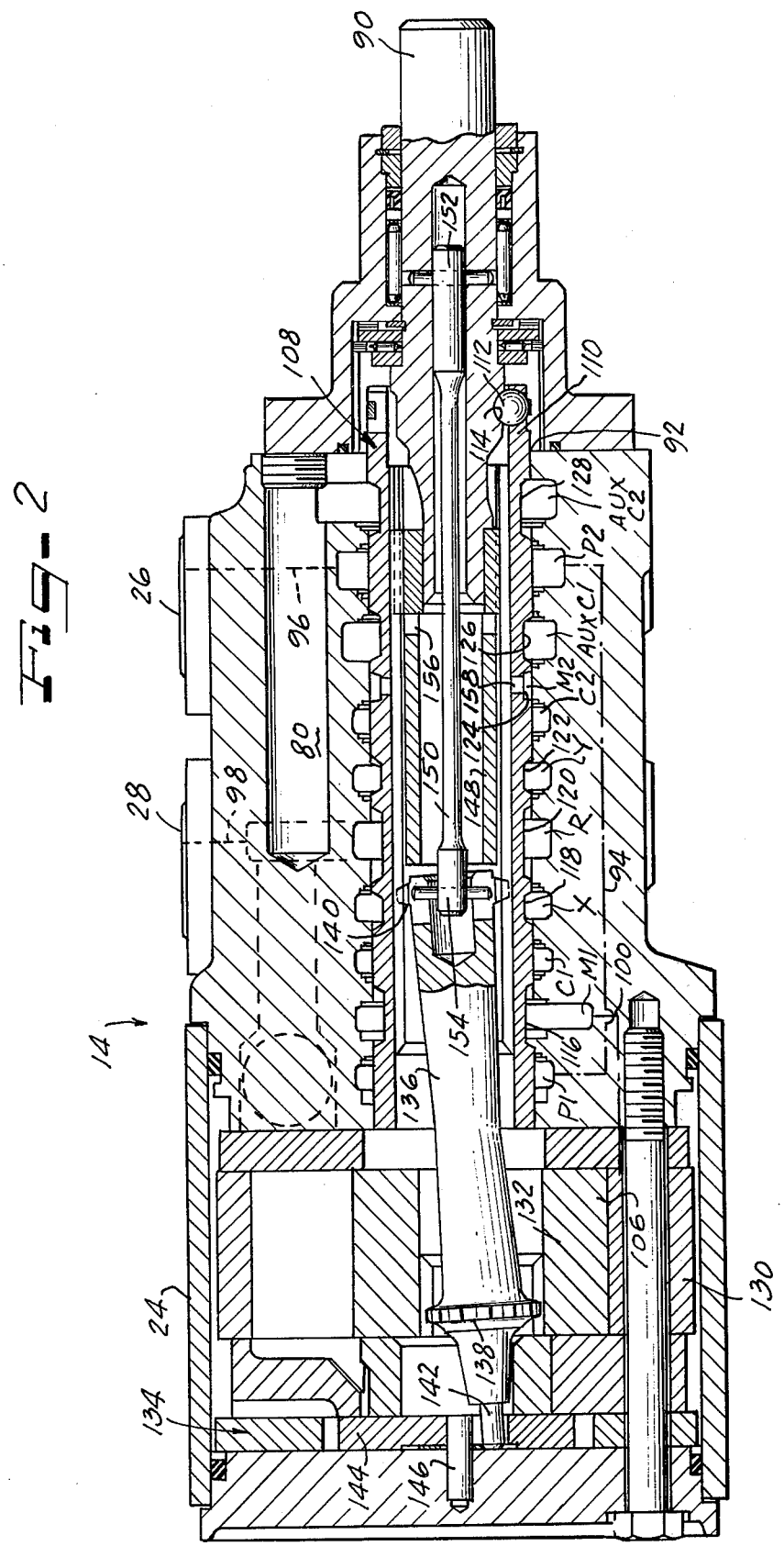
FIG. 2 is a sectional view of a fluid controller used in the system of FIG. 1 and taken generally along the line II—II of FIG. 3.
Figure 3:
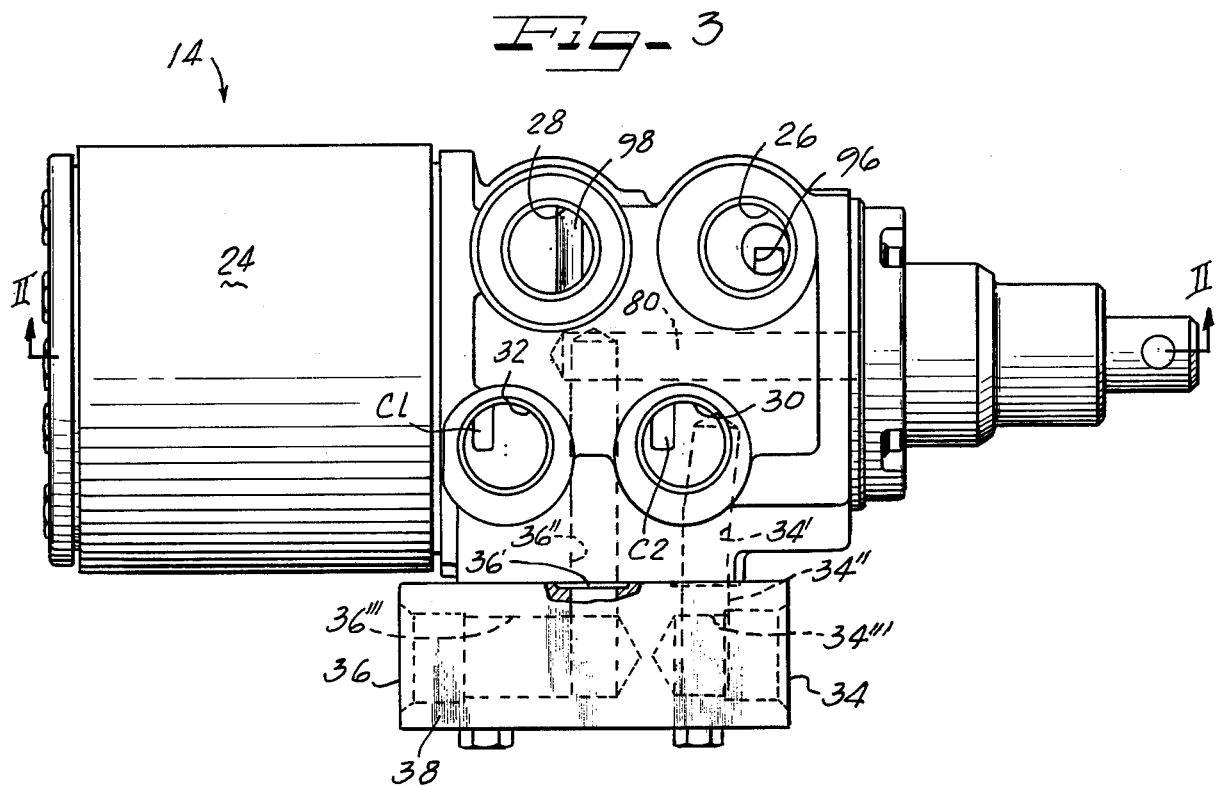
FIG. 3 is an elevation of the fluid controller used in the embodiment of FIG. 2.
Figure 4:
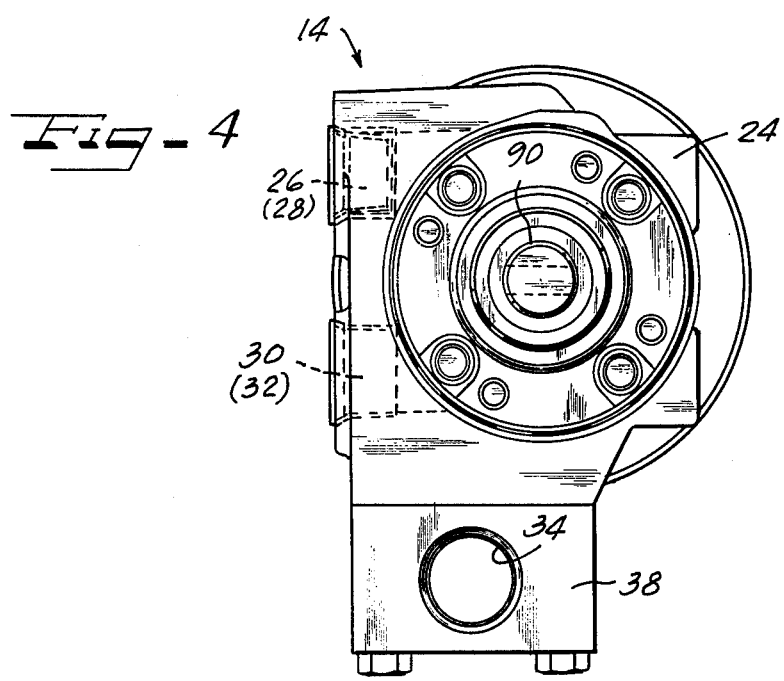
FIG. 4 is an end view of the fluid controller illustrated in FIG. 3.

Referring to FIGS. 2, 3 and 4, an operating shaft 90 is journaled for rotation in the housing 24 of the fluid controller 14. The end of the operating shaft 90 which protrudes from the housing 24 is adapted for connection to a steering wheel either directly or through an extension shaft or the like. Turning the shaft 90 in one direction will result in movement of the steered wheels in one direction, whereas rotation of the shaft 90 in the other direction will cause the steered wheels to move in the opposite direction. There is no direct mechanical connection between the operating shaft 90 and the steered wheels in the embodiment of the invention shown in the drawings.

Also formed in the housing 24 is a cylindrical bore 92 in which is formed a series of axially spaced circumferentially continuous grooves identified respectively, from left to right, as shown in FIG. 2, by reference characters P1, M1, C1, X, R, Y, C2, AUX C1, P2 and AUX C2.

The foregoing grooves are connected to ports 26–36 in the following manner. The grooves P1 and P2 schematically indicated by the borken lines 94, 96 communicate with the fluid inlet port 26. The groove R communicates with the fluid outlet port 28 as indicated by the broken line 98. The grooves C1 and C2 are connected in communication with the ports 32 and 30 as shown in FIG. 3. The groove AUX C1 is in communication with the port 34 in the manner indicated in FIG. 3 via the passages 34', 34'', and 34''', while the groove AUX C2 communicates with the port 36 via the passages 36', 36'', 36''' and 80. Another internal passage 100 communicates the groove M1 to a fluid metering section of the fluid controller 14 indicated generally at reference numeral 106.

A valve spool 108 is carried in the bore 92 for axial and rotational movement therein. One end 110 of the valve spool 108 is coupled to the operating shaft 90 for limited relative rotation therebetween, in response to which, by means of a ball 112 riding in a helical groove 114, the valve spool 108 is shifted axially, as is known.

When the valve spool 108 is in a predetermined position with respect to the operating shaft 90, as shown in FIG. 2, it is in a neutral position. When the operating shaft 90 is then rotated in one direction, the valve spool 108 will shift axially in one direction for the netural position shown. On the other hand, when the operating shaft 90 is rotated in an opposite direction, the valve spool 108 will be shifted axially in an opposite direction from the neutral position shown.

The before-mentioned grooves formed in the bore wall 92 are separated by a corresponding series of lands, and another series of grooves, indicated at reference numerals 116–128, are formed in the outer peripheral surface of the valve spool 108. As the valve spool 108 is shifted axially from the neutral position shown, various ones of the grooves P1 through AUX C2 formed in the bore wall 92 are spanned by and placed in fluid communication with others of the grooves P1 through AUX C2 by way of the grooves 116–128, as will be described in detail hereinbelow.

The fluid metering section 106 comprises a geroter mechanism which includes a pair of fluid displacement members or gears 130 and 132. The gear 130 surrounds the gear 132 and has one more tooth than does the gear 132 such that, in response to relative rotation between the two gears, the axis of the inner gear 132 orbits about the axis of the outer gear 130. A commutator valving mechanism, indicated generally by the reference numeral 134 serves to direct the fluid into and out of the expanding and contracting pockets between the teeth of the gears 130 and 132 and is operatively connected to the inner gear 132 by means of a wobble shaft 136. One portion 138 of the shaft 136 is drivingly connected to the inner gear 132 for joint rotation therewith, while another portion 140 is drivingly connected to the valve spool 108 for joint rotation therewith. An extension 142 of the shaft 136 rotates a commutator valve member 144 about a shaft 146 during operation of the gears 130 and 132. The geroter mechanism 106 and commutator valve will not be described in greater detail, since these are known structures shown in the afore-mentioned Goff patent and do not form a part of the present invention.

The valve member 144 directs pressurized fluid, entering the fluid controller 14 through the fluid inlet port 26, to the expanding fluid pockets formed between the teeth of the gears 130 and 132. High pressure fluid is communicated to the valve member 144 by fluid passages including the passage 100. The valve member 144 also directs the fluid from the contracting fluid pockets formed between the teeth of the gear members 130 and 132 and through passages formed in the fluid controller 14 including a bore 148 formed in the valve spool 108. Although the fluid displacement members illustrated are of the geroter type, other metering means may be conveniently utilized.

A torsion rod 150 is connected fast at one end 152 to the operating shaft 90, whereas an opposite end 154 is connected fast to the shaft 136. The torsion rod 150 comprises a mechanical biasing member for constantly biasing the valve spool 108 to a neutral position relative to the operating shaft 9.

In many respects, the fluid controller 14 is similar to the controller 15 illustrated and described in Raymon L. Goff et al. U.S. Pat. No. 3,452,543, the disclosure of which is incorporated herein by reference. The patent discloses additional features of the fluid displacement section as well as other features of the fluid controller 14 which will not be discussed in detail herein.

The operation of the fluid controller 14 may be briefly described as follows. In the neutral position of the valve spool 108 shown in FIG. 2, high pressure fluid is directed from the fluid inlet port 26 to the grooves P1 and P2. Since the latter grooves are blocked by the spool 108 (closed center valve) there is a static condition with respect to control via the working and auxiliary ports. Since no flow exists, the pump 10 destrokes (the pump 10 is a conventional variable displacement pump). This destroking occurs after the pump fills an accumulator 10A. The pump 10 then functions to hold a suitable pressure head. Details of the pump 10 will not be discussed, since they do not form part of the present invention.

When the shaft 90 is turned in a rightward or clockwise direction from a neutral position, as it is viewed from the right-hand end thereof shown in FIG. 2, this will cause the valve spool 108 to shift leftwardly.

After the operating shaft 90 has been rotated sufficiently, the valve spool will be shifted far enough leftwardly whereby groove M1 will communicate with groove P1 through the groove 116 formed in the valve spool 108. From groove M1, the high pressure fluid flows through passage 100 to the valve 144, then to the expanding fluid pockets between the teeth of the geroter gears 130 and 132 and then back to the valve member 144 to the interior bore 148 of the valve spool 108. From there, the fluid flows through a radial passage 158 formed in the valve spool 108 and then through the groove 124 (M2) to the groove C2, from which it flows to the cylinder or working port 30 and on to the steering cylinder 42. Located within the valve spool 108 is a spacer for spacing the shaft and torsion bar 150. An opening 156 is provided in the spacer to direct fluid from the interior thereof to the valve spool 108 if fluid flows thereinto. The majority of flow is around the outside of the spacer.

The fluid returning to cylinder port 32 from steering cylinder 62 enters groove C1, from which it flows to the groove X through the groove 118 and then to groove R via the groove 120 from which it flows to the fluid outlet or return port 28.

The auxiliary port 36 also delivers fluid by virtue of its communication with the grooves AUX C2 which communicates with the pressure groove P2 via the spool groove 128. At this time, however, the auxiliary port 34 is blocked by the lands between the grooves 124 and 126, and between the grooves 126 and 128.

As the pressurized fluid is communicated with gear members 130 and 132, the internal gear or rotor 132 is rotated in the same direction as the shaft 90 by the driving connection 138 and the valve spool 108 is also rotated by means of the shaft 136. As shaft 90 is rotated by the operator, the geroter gears 130, 132 and valve spool 108 rotate and when the shaft 90 is returned to its neutral position the torsion bar 150 will return the valve spool 108 to its neutral position, all as should be understood by those skilled in the art.

Rotation of the operating shaft 90 in a counterclockwise direction has the effect of shifting the valve spool 108 rightwardly as viewed in FIG. 2 from the neutral position shown. After the operating shaft 90 has rotated relative to the valve spool 108 sufficiently, the groove P2 communicates with groove 124 (M2) via the grooves 126 and AUX C1, thereby supplying pressurized fluid through the passage 158 into the interior of the valve spool 108. From there, the pressurized fluid flows through the valve element 144 to the expanding pockets between the teeth of the gears 130 and 132. The fluid flowing from between the contracting fluid pockets is delivered by the valve element 144 to the passage 100, from which it flows through the groove M1 and the groove 116 to the cylinder groove C1. From the groove C1, the fluid flows to the working port 32 to actuate steering cylinder 56. The low pressure fluid returning from the cylinder 42 via the cylinder port 30 flows through the groove C2 into the groove 122, from which it flows into the grooves Y and 120 to the return groove R, which communicates with the fluid return port 28.

The auxiliary port 34 also discharges fluid by virtue of its communication with the groove AUX C1 which in turn communicates with the pressure groove P2; the port 36 is blocked at this time.

Blocking of the ports 34 and 36 during respective opposite turning maneuvers as described above requires that a fluid return path be established, which path bypasses the blocked port, but includes the groove R and its fluid communication path to the reservoir 22. This function is provided by the block check valves 84, 86 as will be understood from the following exemplary embodiment of the invention in an example of total system operation.

It will be appreciated by those skilled in the art that, in situations where the power fluid pump 10 is inoperative, the fluid controller 14 will operate as a fluid hand pump generating pressurized fluid to actuate the hydraulic cylinders 42 and 56. In this connection, the geroter metering mechanism including gears 130, 132 acts as a pump when manually turned by rotation of the steering shaft 90. The geroter metering mechanism thereby creates a fluid flow from the reservoir to the respective steering cylinder ports 48, 62 (depending on the direction of turning of the shaft 90) to thereby effect manual steering. Thus, while there is no direct mechanical connection between the steered wheels and the steering wheel, there is a hydraulic connection, even when the power fluid pump 10 is inoperative.

Referring now to FIG. 1, the hydrostatic steering system is illustrated with arrows indicating the flow paths of fluid from the reservoir 12, through the pump 10, directionally through the fluid controller 14 to the hydraulic cylinders 42 and 56, then from the cylinders back to the fluid controller 14 and to the reservoir 22.

Additional arrows on the drawing aid in an exemplary illustration of flow quantities for a steering cylinder rod area to head area ratio of 1:2, the flow reference 2Q signifying the bulk flow for cylinder operation, the reference Q indicating the metered fluid flow and the reference 3Q indicating the total fluid provided by the pump 10 for system operation and indicating return flow.

Assuming that the shaft 90 is rotated in a direction to provide bulk flow from the auxiliary port 36, as discussed above, and assuming that the pump 10 is supplying a flow 3Q, for example 60 G.P.M. at 2000 p.s.i., to the high pressure input port 26, a flow 2Q is discharged at the auxiliary port 36 and supplied by way of the conduit 76 and the input/output port 64 to the head side of the hydraulic cylinder 56. At the same time, a flow Q is discharged from the working port 30 by way of the conduit 70 and the input/output port 48 to the rod side of the hydraulic cylinder 42. A flow Q is returned from the rod side of the hydraulic cylinder 56 over a path including the input/output port 62, the conduit 72, the working port 32, the internal valving structure of the fluid controller previously traced, the output port 28 and the conduit 40. A flow 2Q is returned to the reservoir 22 from the head side of the hydraulic cylinder 42 over a path including the input/output port 50, the conduit 74 and the block check valve 86 which opens to join the flow Q from the rod end of the cylinder 56 and form a flow 3Q which then continues over the previously traced path including the conduit 72, the working port 32, the internal valving structure of the controller 14, the output port 28 and the conduit 40. The flow 2Q from the head side of the cylinder 42 does not, therefore, return through the other auxiliary port 34 in that this port is internally blocked by the axial shift of the valve 108 to the left, as illustrated in FIG. 2, where there is no communication of the groove AUX C1 with any of the other grooves. Rotation of the shaft 90 in the opposite direction, to axially shift the valve 108 to the right from the position illustrated in FIG. 2, sets up similar flow paths werein the auxiliary port 34 discharges a flow 2Q, the working port 32 discharges a flow Q, and a flow 3Q is returned by way of the working port 30 from an addition of a flow Q from the rod end of the cylinder 42 and a flow 2Q from the head end of the cylinder 56 by way of the block check valve 84.

It will be readily appreciated by those skilled in the art that a positive displacement and metering of fluid is provided to a cylinder from a working port, that an equivalent flow is discharged from the other hydraulic cylinder to the other working port, that an auxiliary port supplies a bulk flow that is proportional to the metered flow and that an equivalent bulk flow is added via a check valve to the return flow which is equivalent to the metered flow for return to the reservoir by way of the fluid controller. The proportionality and flow requirements are established by the rod-end area to head-end area ratio of the hydraulic cylinders.

As mentioned above, the auxiliary ports supply the bulk flow and the greater force at the head side of the hydraulic cylinders. Inasmuch as the hydraulic cylinders operate in opposite directions, it is readily apparent that the fluid discharged from a working port 30 or 32 functions as a metered booster supply to the rod end of the other cylinder. The metered fluid flow provides a flow which is proportional to the amount of rotation of the steering shaft 90 and thus, as is known, the steering of the vehicle wheels properly follows turning of the shaft 90. The cylinders, of course, will be mechanically connected to the wheels or the like of a vehicle in a manner which is complementary to the oppositely acting pistons.

In the above-described embodiment, it should be apparent that a closed center valve is provided in the controller 14 along with a variable displacement supply pump 10 and accumulator 10A. Also, due to the porting in the controller 14, certain fluid flow is metered by the geroter mechanism 106 and then directed to a steering cylinder, while other fluid flow bypasses the metering mechanism. This enables manual steering to be accomplished, even though the supply pump 10 is inoperative.

It should, of course, be clear that an open center valve may be utilized, i.e., one where in neutral a continuous flow is provided. In such a system a constant displacement supply pump may be used and an accumulator is not required. Moreover, it should be clear that a controller may be used that does not provide for manual steering if the supply pump is not operative. Yet such a system can still provide for proper steering.

Figure 5:
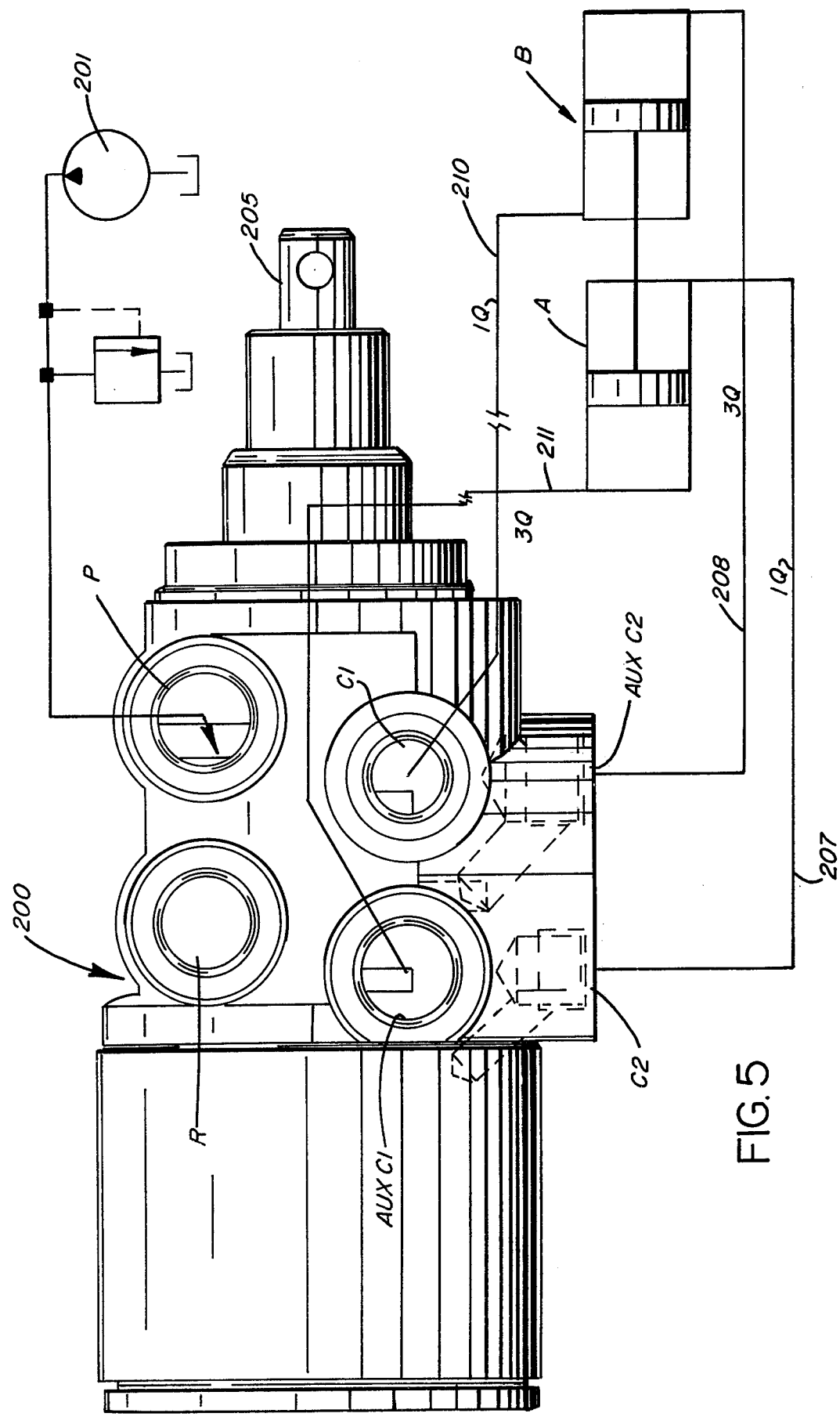
FIG. 5 is a schematic fluid circuit diagram of another embodiment of a hydrostatic steering system constructed in accordance with the present invention.
Figure 6:
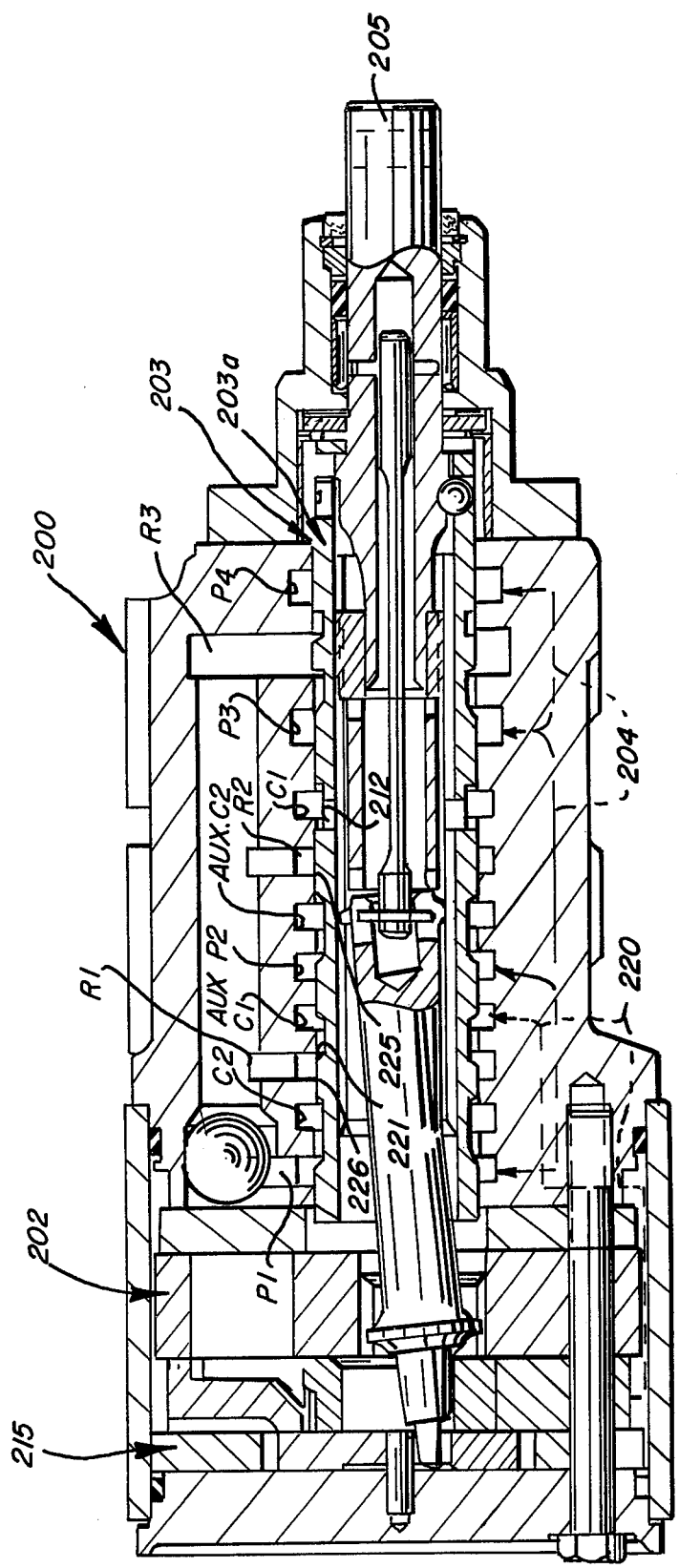
FIG. 6 is a sectional view of the controller used in the embodiment of FIG. 5.

The embodiment of the present invention illustrated in FIGS. 5 and 6 is generally similar to the embodiment of FIGS. 1–4 except in the embodiment of FIGS. 5 and 6 an open center valve is provided and no manual steering can be accomplished. Accordingly, the description hereinbelow will be directed primarily to explaining these differences.

In the system illustrated in FIG. 5, the hydraulic controller, designated 200, receives fluid at its input port P from a constant displacement pump 201. As in the embodiments described above, the hydraulic controller 200 includes a metering mechanism, generally designated 202, in the form of a geroter metering mechanism and includes a valve mechanism, generally designated 203 (FIG. 6), for controlling the porting of fluid to and from the steering cylinders which are designated A and B.

As noted hereinabove, the system of FIGS. 5 and 6 includes an open center valve and therefore the ports P3, P4 which communicate with the supply port P via passages 204 (shown schematically) are constantly open to port R3 when the valve spool 203a is in its neutral position. This results in fluid being ported continuously to port R3 which communicates with the reservoir. Accordingly, flow may continue from the pump into the ports P3, P4 and thereby through adjacent grooves on the valve spool 203a of the valve means 203 and be directed through the port R3 when the valve spool 203a and shaft 205 are in their neutral position.

When, however, the steering shaft 205 of the controller 200 is rotated, the valve spool 203a will be shifted to the right or left from a neutral position as described above in connection with the valve spool of the controller of the embodiment of FIGS. 1–4. The valve spool 203a is illustrated in FIG. 6 as being shifted toward the left from its neutral position. This reduces the flow from P3 and P4 to R3. This flow is reduced and orificed to provide system pressure. In addition, fluid flows from supply port P1 to port C2, as well as from supply port P2, to port AUX C2 in the body of the controller.

The fluid which flows to port C2 is communicated by a suitable conduit 207 to the rod end of the cylinder A. Fluid which is communicated to the auxiliary port AUX C2 is communicated by conduit 208 to the head end of the cylinder B. In the embodiment illustrated, the quantity of fluid which flows from C2 may be termed 1Q, and the volume of fluid which flows through conduit 208 may be termed 3Q for purposes of illustration. Accordingly, the return flows from the cylinders A and B are 1Q and 3Q, respectively, since these cylinders are proportionately sized, as in the embodiment of FIGS. 1–4. More specifically, the return flow from the rod end of cylinder B is through a conduit 210 and is of a quantity 1Q. The return flow from the cylinder A is through a conduit 211 and may be termed of a quantity 3Q. The fluid which is returned through the conduit 211 to the controller 200 communicates with the groove AUX C1 in the controller and is communicated to the reservoir through reservoir port R1 by a groove on the outer periphery of the valve spool 203a. This flow between the port AUX C1 and R1 is metered or orificed. This orifice, designated 221, constitutes the main system control orifice to provide system pressure and proper follow-up control of the cylinders A and B.

However, the fluid which flows through the conduit 210, which is of a quantity 1Q, returns to the inlet port C1. The inlet port C1, when the valve spool 203a is in the position illustrated in FIG. 6 communicates through a passageway 212 with the interior of the controller and fluid flows through the interior of the controller into the commutator valve 215 which is associated with the geroter mechanism 202. The flow into the commutator valve is then directed into the geroter mechanism, namely, into the expanding pockets thereof, and flow is then directed from the geroter mechanism, namely, from the contracting pockets thereof back through the commutator valve mechanism 215, all as is known. The flow which leaves the commutator valve from the contracting pockets of the geroter may be termed "metered oil flow", and is directed by way of passageway 220, illustrated in dot-dash lines in FIG. 6, to the groove AUX C1 in the controller valve body. That flow then is directed past orifice 221, to R1 which communicates with the reservoir.

Accordingly, it is the return of fluid in the embodiment of FIGS. 5 and 6 which is metered through the geroter mechanism and which provides the desired follow-up action between the steering wheel rotation and the turning of the vehicle wheels. Of course, since the geroter mechanism acts on the return fluid flow from the cylinder B, the metering mechanism cannot operate on manual turning to effect pumping of fluid to effect a steering action.

In the embodiment illustrated in FIG. 5, the fluid flow is in a somewhat reverse direction whenever the valve spool 203a is turned to effect shifting of the valve spool to the right from its neutral position. When the valve spool is shifted to the right, the pressure port P2 commnicates with the auxiliary fluid port AUX C1. This flow is then communicated through passage 220 to the commutator valve 215 and to the geroter mechanism 202. That fluid then flows through the interior of the controller through port 212 and to the port C1. The flow is then from the port C1, which in this case would be metered flow, through the conduit 210 to the rod end of cylinder B. The return flow from the head end of cylinder B is through the conduit 208 to the port AUX C2 which then communicates past an orifice 225 to the reservoir through port R2. Flow also simultaneously flows from P2 to port AUX C1 and then to the head end of cylinder A through the conduit 211. The return flow from the rod end of cylinder A is to port C2 which communicates with the reservoir port R1 past an orifice 226.

Accordingly, it should be clear from the above that applicant has provided a new and improved steering system which may be embodied in a substantial number of different embodiments and may utilize open center valving or closed center valving, or may also provide for manual steering or for no manual steering in the system.

In essence, the system includes proportionately sized cylinders which are sized in proportion to the rod-end to head-end area ratio of the cylinders and where flow is directed to those cylinders to effect actuation thereof, one flow going to the rod end of one cylinder and another flow going to the head end of the other cylinder. The flows to the cylinders are directed thereto through a hydraulic controller and the return flows from the cylinders are likewise directed to a hydraulic controller. One of these flows is communicated to a metering mechanism, in order to properly meter the flow of fluid either to or from a cylinder and thereby control the proper actuation of the cylinder so that vehicle steering properly follows turning of the steering wheel. The controller in each of the embodiments consists of a single unitary structure where the metering mechanism includes a geroter mechanism associated with a valve member and which valve member provides porting of the fluid in the desired direction. The valve member and the geroter mechanism are associated with the steering control shaft so that upon rotation thereof the steering mechanism as well as the valve member are operated in order to properly port fluid and also in order to properly meter the fluid so that the proper steering action occurs.

Having described the invention, what is claimed is:

1. A steering system comprising a set of steering cylinders which when actuated effect steering, said set of steering cylinders comprising at least two proportionately sized cylinders, and steering control means associated with said respective proportionately sized cylinders, said steering control means comprising valve means for directing a first flow to one of said proportionately sized cylinders and a second flow to another of said proportionately sized cylinders to effect actuation thereof, said first and second flows being in accordance with the proportionate sizing of the cylinders, said valve means receiving the return third flow from said one of said cylinders and the return fourth flow from the other of said cylinders, said steering control means further including a metering means for metering one of said flows, input operator control means for operating said metering means and valve means upon operator steering, and said valve means including fluid porting for directing one of said return flows to said metering means for metering of said one return flow and for directing said metered return flow to a reservoir.

2. A steering system comprising,
a set of steering cylinders which when actuated ir two different respective directions effect steering in said two different respective directions,
said set of steering cylinders comprising at least two proportionately sized cylinders, and
steering control means for actuating said cylinder: including,
valve means for directing two different flows to said respective proportionately sized cylinders in accor dance with the proportionate sizing thereof to effect actuation thereof for steering in one direction and for receiving return flows from said proportionately sized cylinders, metering means for metering one of said flows, and input means for operating said metering means and said valve means to effect steering thereof, said one of said flows comprising one of said return flows and said valve means including fluid porting for directing said one of said return flows to said metering means and for directing said metered return flow to a reservoir.

3. A steering system comprising a set of steering cylinders which when actuated in two different respective directions effect steering in said two different respective directions, said set of steering cylinders comprising at least two proportionately sized cylinders, and steering control means for actuating said cylinders including a pump comprising a sour of fluid, valve means for receiving fluid from said pump and for directing two different flows of fluid from said pump to said respective proportionately sized cylinders in accordance with the proportionate sizing thereof to effect actuation thereof for steering in one direction and for receiving return flows from said proportionately sized cylinders, metering means for receiving one of said flows from said valve means and for metering said one of said flows, input means for operating said metering means and said valve means to effect steering, said input means comprising a shaft having a mechanical connection with said metering means and said valve means, the mechanical connection with said valve means comprising mechanical means for shifting said valve from a neutral position to an actuated position in response to turning of said shaft, said shaft, valve means and said metering means being aligned in generally axial alignment and said valve means and said metering means being located within a common housing into which said shaft extends, said valve means comprising an axially shiftable valve spool located in a bore in said housing, said spool including a peripheral wall which is slidably related to the bore wall to form mating walls defining a series of axially spaced grooves selectively communicating with said inlet, outlet, and first and second ports in different axial operating positions of said spool, said valve spool including a hollow interior passage through which fluid flows to or from said metering means depending on the direction of rotation of said shaft.

4. A steering system as defined in claim 3 wherein said valve element is rotatable relative to said shaft from a first position in which the valve element is in said neutral position to a second position in which the valve element is in an operating position, and follow-up means interconnecting a part of said metering means and said valve element for joint rotation tending to move the valve element from said operating position to said neutral position upon termination of rotation of said operating shaft.

5. A steering system as defined in claim 3 wherein said metering means comprises positive fluid displacement means including a pair of relatively movable intermeshing gear members, and wherein said valve spool is rotatable, said valve spool being rotatable relative to said operating shaft to effect movement thereof from a first position at which said valve spool is at said neutral position to a second position at which said valve spool is at an operating position, and follow-up means interconnecting one of said gear members and said valve spool for joint rotation tending to move said valve spool from said operating position to said neutral position upon termination of rotation of said operating shaft.

* * * * *